(12) United States Patent
Vogel et al.

(10) Patent No.: US 7,795,840 B2
(45) Date of Patent: Sep. 14, 2010

(54) BATTERY CHARGER WITH A PLANAR BUS

(75) Inventors: Bernard J. Vogel, Troy, OH (US); Brian A. Schwartz, Appleton, WI (US); Christopher D. McInnis, Little Chute, WI (US)

(73) Assignee: Illinois Tool Works, Inc., Glenview, IL (US)

( * ) Notice: Subject to any disclaimer, the term of this patent is extended or adjusted under 35 U.S.C. 154(b) by 539 days.

(21) Appl. No.: 11/854,346

(22) Filed: Sep. 12, 2007

(65) Prior Publication Data

US 2009/0066289 A1 Mar. 12, 2009

(51) Int. Cl.
*H01M 10/46* (2006.01)
(52) U.S. Cl. ..................................... 320/107
(58) Field of Classification Search ............... 320/107, 320/110, 128, 132, 138, 139, 141
See application file for complete search history.

(56) References Cited

U.S. PATENT DOCUMENTS

| | | | |
|---|---|---|---|
| 3,614,297 A | 10/1971 | Carlson | |
| 4,489,223 A * | 12/1984 | Puckett et al. | 320/105 |
| 4,733,025 A | 3/1988 | Buerkel | |
| 4,924,169 A * | 5/1990 | Shifflet et al. | 320/112 |
| 5,422,440 A | 6/1995 | Palma | |
| 5,548,200 A | 8/1996 | Nor et al. | |
| 5,642,260 A | 6/1997 | Sigl | |
| 5,783,799 A | 7/1998 | Geissler | |
| 6,495,992 B1 | 12/2002 | Pavlovic | |
| 6,803,746 B2 | 10/2004 | Aker et al. | |
| 6,815,639 B2 | 11/2004 | Geissler | |
| 7,102,256 B2 | 9/2006 | Murakami | |
| 2002/0011470 A1 | 1/2002 | Domschot | |
| 2006/0110987 A1 | 5/2006 | Schwartz et al. | |

FOREIGN PATENT DOCUMENTS

| | | |
|---|---|---|
| DE | 20018092 U | 12/2000 |
| WO | 9504448 A | 2/1995 |
| WO | 03041255 A | 5/2003 |
| WO | 2006/054185 A1 | 2/2006 |

OTHER PUBLICATIONS

John Vincent: Bus Bar Design, Precision Power Products Design Information, [online] Dec. 22, 1998: http://www.3pco.com/content/enginfo/busbar.pdf, whole document.

* cited by examiner

*Primary Examiner*—Edward Tso
(74) *Attorney, Agent, or Firm*—Quarles & Brady LLP

(57) ABSTRACT

A battery charging system which includes an input circuit configured to receive an input power and provide an output power on a first output terminal and a second output terminal. An output circuit has a first input terminal connected to the first output terminal and a second input terminal connected to the second output terminal to receive the output power and configured to condition the output power for a battery charging process. A first conductive plate with a first bus surface extends between the first input terminal and the first output terminal. An insulator plate has a first insulator surface disposed in an abutting relationship with the first bus surface and a second insulator surface. A second conductive plate has a second bus surface which extend between the second input terminal and the second output terminal and is disposed in an abutting relationship with the second insulator surface.

21 Claims, 8 Drawing Sheets

BATTERY CHARGER WITH A PLANAR BUS

REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates generally to battery charging systems and, more particularly, to a planar bus for a fast-charging battery charging systems.

BACKGROUND OF THE INVENTION

Fast-charging, battery charging systems are distinguished from other battery charging systems in that they operate to produce a battery charging output with a higher kilowatt output and approximately twice, or greater, the charging rate than traditional battery charging systems. An industrial-type, fast charging, battery charging system can include a power supply connected to one or more charging stations, and the charging stations can have output currents up to 500 A or greater, and power outputs up to 30 kW and greater. Compatible battery voltages are typically 12 to 80 volts from a lead-acid battery or battery bank. The industrial-type, fast charging, battery chargers can typically be used for charging lift trucks, fork lifts, golf carts, and the like, which chargers operate at relatively higher electrical power levels to charge a 12-80 volts direct current (VDC) battery system. In these systems, the battery is the main power source for driving the fork lift, golf cart, and the like.

These fast charging systems can have a primary side switched-mode power supply that converts a mains alternating current (AC) electrical power into a suitable direct current (DC) electrical power. A chopping circuit may also be included to convert the DC electrical power to charging power. In general terms, the switched-mode power supply can include input terminals for mains input, and an input rectifier and filter for filtering and rectifying the mains input, an inverter for converting the rectified input power to a higher frequency, a high frequency transformer which converts the voltage up or down to the required output level on its secondary winding(s), and another rectifier and/or output chopper circuit to provide a suitable DC battery charging power. Mains power can be 120, 240, 480, 600, or higher, VAC, and single phase or multiphase being typical for the higher voltages. A switched-mode power supply has the advantage of providing a relatively high frequency to the transformer, which allows the transformer to be smaller for a given current capacity, as transformer size is inversely related to operating frequency.

Fast-charging, battery charger, power supplies can generally require a number of heat generating electrical devices such as transformers, power modules which may have insulated gate bipolar transistor (IGBT) switching modules, inductors, rectifiers, transducers and the like interconnected through busses or bus bars, circuit boards, connectors, cables, etc. Because of the high current and/or voltages involved, such power supplies can have electrical devices as mentioned that generate a considerable amount of heat which needs to be dissipated in order to prevent damage to the battery charging power supply, and to increase the reliability of the battery charging power supply. Some of these devices (e.g., transformers) are relatively robust, whereas other (e.g., the integrated circuits used on the power modules and other circuit boards) are susceptible to contaminants and other elements such as static electricity.

Typically, the initial rectified voltage is provided to a bus (i.e., a conductor or conductors that provides a fixed or varying potential to a variety of components), which is disposed across a capacitor bank for filtering. The inverter (switched circuit) then inverts the electrical power and converts it to a higher frequency. Some designs, such as those including chopper circuits, have a second bus which is further processed by the output circuit.

It is also well know that fast-charging battery charging systems can become hot during use. Components can be cooled by blowing air past them, but it is also known that blowing air can bring particles past sensitive components, such as integrated circuits, switches, etc., which could damage them. Thus, there are competing concerns, cooling components and keeping components safe from dirt, other contaminants, etc.

Higher output fast-charging battery charging systems have a bus or bus bar that can become very hot due to the high currents and corresponding $I^2R$ heating. Generally, as the battery charging current output rises, the bus or bus bar must be able to dissipate more heat. Prior art designs do not adequately address the design of bus or bus bars to reduce/dissipate heat so that they do not need to have air blown past them. Bus or bus bar(s), as used herein, can refer to one bus or bar (or bar at one potential), or multiple busses or bars at different potentials, and bus or bar refers to the conductor, not a particular shape.

Accordingly, what is needed in the art is a fast-charging battery charging system power supply that has a bus and/or a bus assembly that can be used at high current without overheating, and which has inherent heat dissipation capabilities.

SUMMARY OF THE INVENTION

Generally, the invention provides for a battery-charging power supply with a planar bus, wherein the layers include an insulator plate sandwiched between two bus bars, preferably in the shape of plates. The bus bars are at different potentials in operations, and the bus voltage is the voltage difference across the bars. Planar bus, as used herein includes a bus comprised of layers in a fixed relation to one another. They can be fixed with adhesive, fasteners, etc. Insulator plate, as used herein, includes an insulating material where the surface area is large relative to the thickness. Conductive plate, as used herein, includes a conductor having a surface area large relative to the thickness.

The invention comprises, in one form thereof, a battery charging system which includes an input circuit configured to receive an input power and provide an output power on a first output terminal and a second output terminal. An output circuit has a first input terminal connected to the first output terminal and a second input terminal connected to the second output terminal to receive the output power and configured to condition the output power for a battery charging process. A first conductive plate with a first bus surface extends between the first input terminal and the first output terminal. An insulator plate has a first insulator surface disposed in an abutting relationship with the first bus surface and a second insulator surface. A second conductive plate has a second bus surface which extend between the second input terminal and the second output terminal and is disposed in an abutting relationship with the second insulator surface.

The invention comprises, in another form thereof, a battery charging system which includes an input circuit with a rectifier for receiving and rectifying an input electrical power thereby producing a rectified electrical power, the input circuit having a first output terminal and a second output terminal for outputting the rectified electrical power. A switched circuit has a first input terminal and a second input terminal for receiving the rectified electrical power, and the switched circuit includes at least one switch for transforming the rectified electrical power to a switched power. An output circuit is connected to the switched circuit to receive the switched power and produce a battery charging power. Battery charging cables are connected to the output circuit to receive the battery charging power. A bus assembly connects the input circuit to the switched circuit. The bus assembly includes a first bus plate extending along a first plane and configured to carry a positive charge and a second bus plate extending along a second plane and configured to carry a negative charge.

The invention comprises, in yet another form thereof, a method of manufacturing a bus assembly in a battery charger, where the bus assembly connects an input circuit which has a first output terminal and a second output terminal, and a switched circuit which has a first input terminal and a second input terminal. The method comprises the steps of: providing a bus including a first conductive plane and a second conductive plane separated by an insulating layer; connecting the first conductive plane to the first output terminal and the first input terminal; connecting the second conductive layer to the second output terminal and the second input terminal; and isolating the first conductive plane from the second conductive plane by arranging a substantially planar electrical isolator to abut the first conductive plane along a first side and the second conductive plane along a second side.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
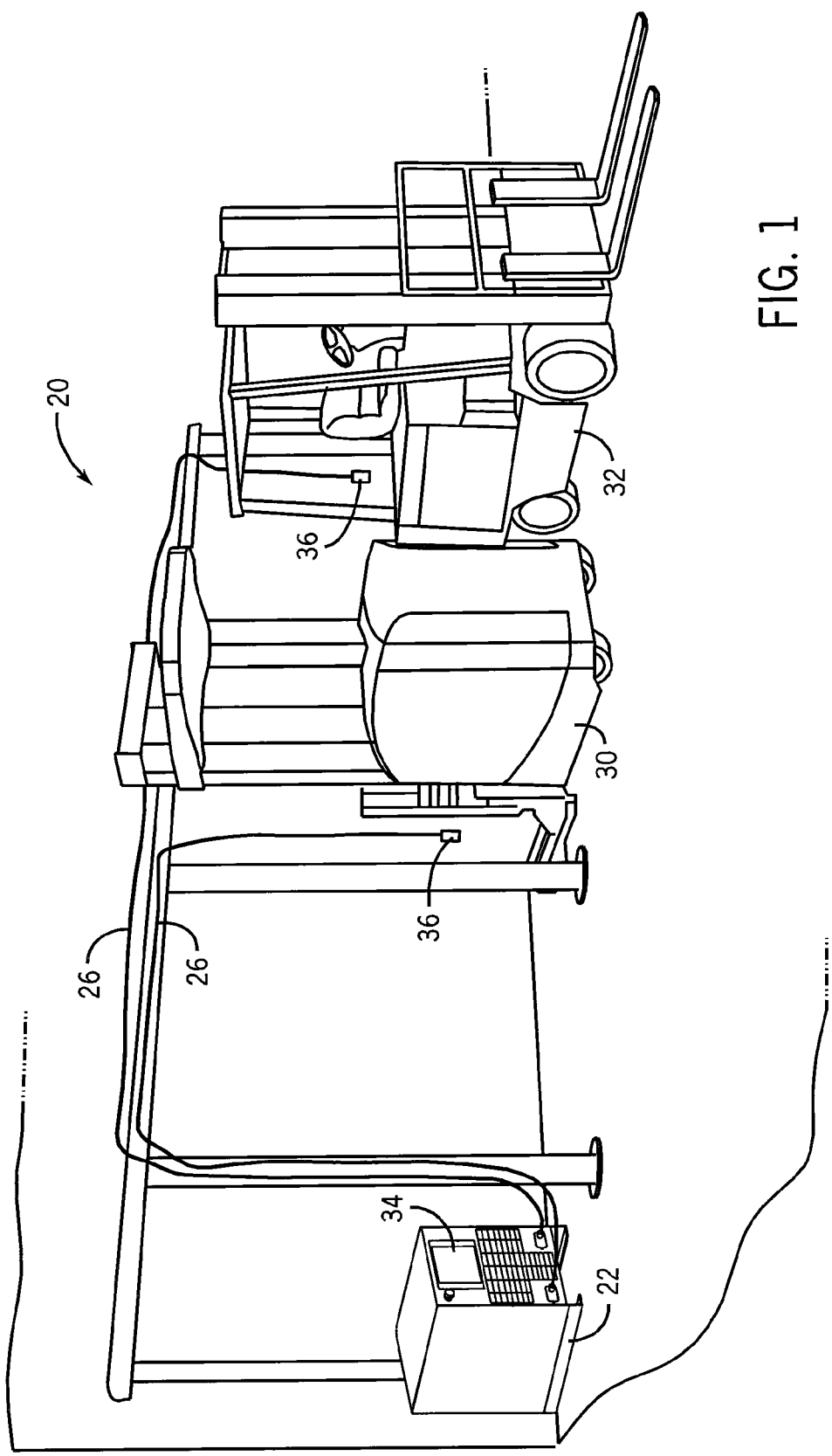
FIG. 1 is a perspective view of an embodiment of a battery charging system according to the present invention, shown with a lift truck and a forklift.

Referring now to the drawings, and more particularly to FIG. 1, a battery charging system 20 includes battery-charging, power supply 22 that provides a battery charging energy over cables 26. While a centralized battery-charging, power supply 22 is shown, it is also contemplated that the present invention may be utilized in other battery-charging, power supply/charging stations systems, daisy-chain power supply arrangements, and the like. Battery-charging cables 26 connect to, and provide a battery-charging power (such as a DC current at an appropriate battery system voltage) for, the battery systems of lift truck 30, forklift 32, and/or other battery powered systems. Battery charging system 20 can also include a battery module (not shown) which is carried by, and is connected to, the battery systems of vehicles 30, 32 and the like, and provides some control and monitoring to assess battery health and the charging process, charging and discharging history, and download capability for these parameters to provide fleet operations data.

Battery-charging, power supply 22 can include a display 34 that may indicate charge level, charge time, charge voltage, and other relevant parameters of the charging process. Battery-charging, power supply 22 can also include on/off, and other, controls; short circuit, ground fault, and/or other electrical anomaly sensing circuits; feedback circuits providing feedback from the sensing circuits to the control circuits; and other terminals, connectors, controls and circuits as are known.

Figure 2:
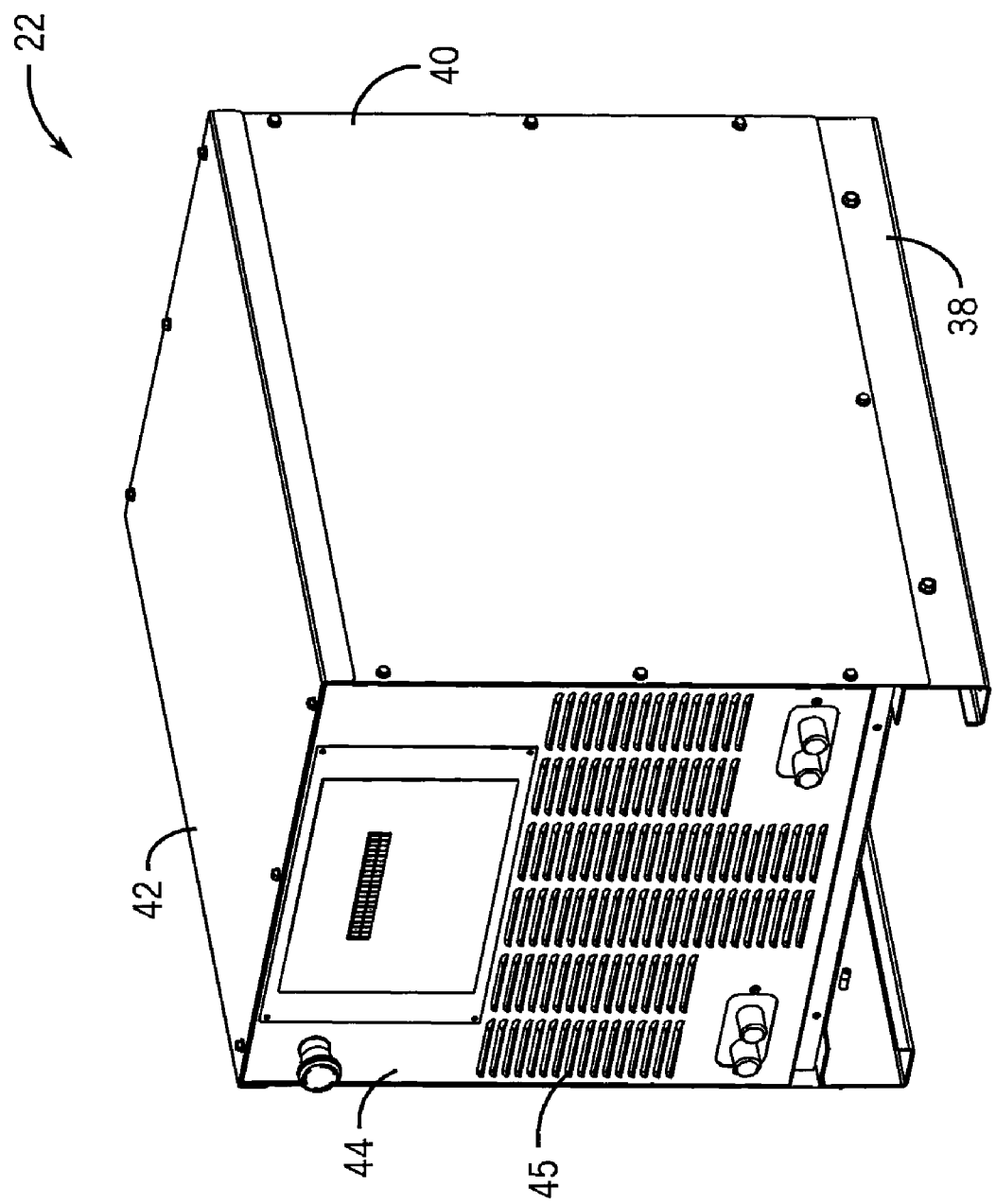
FIG. 2 is a perspective view of the power supply of the battery charging system of FIG. 1.
Figure 3:
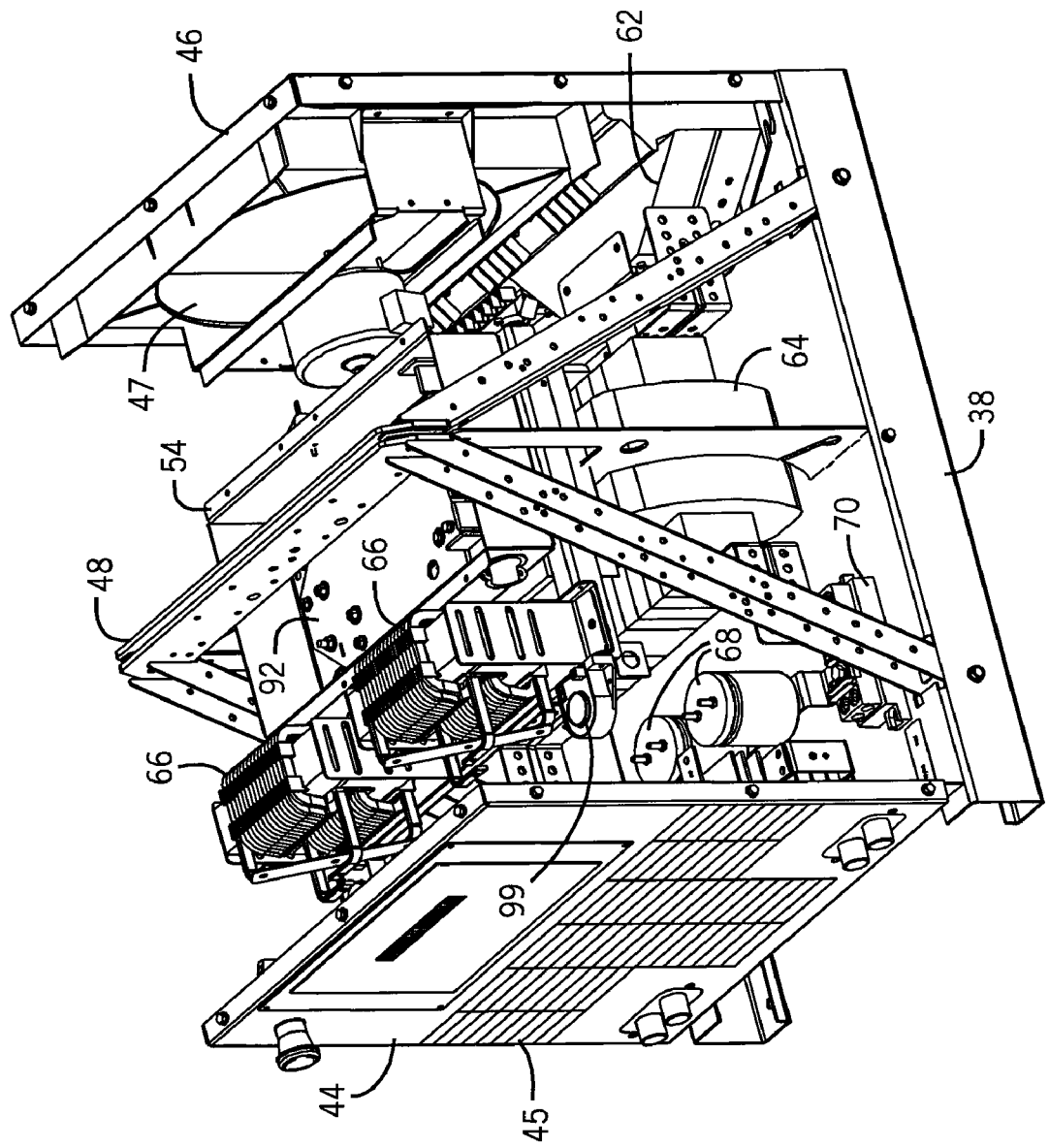
FIG. 3 is a perspective view of the power supply of FIG. 2, with part of the cover removed.
Figure 6:
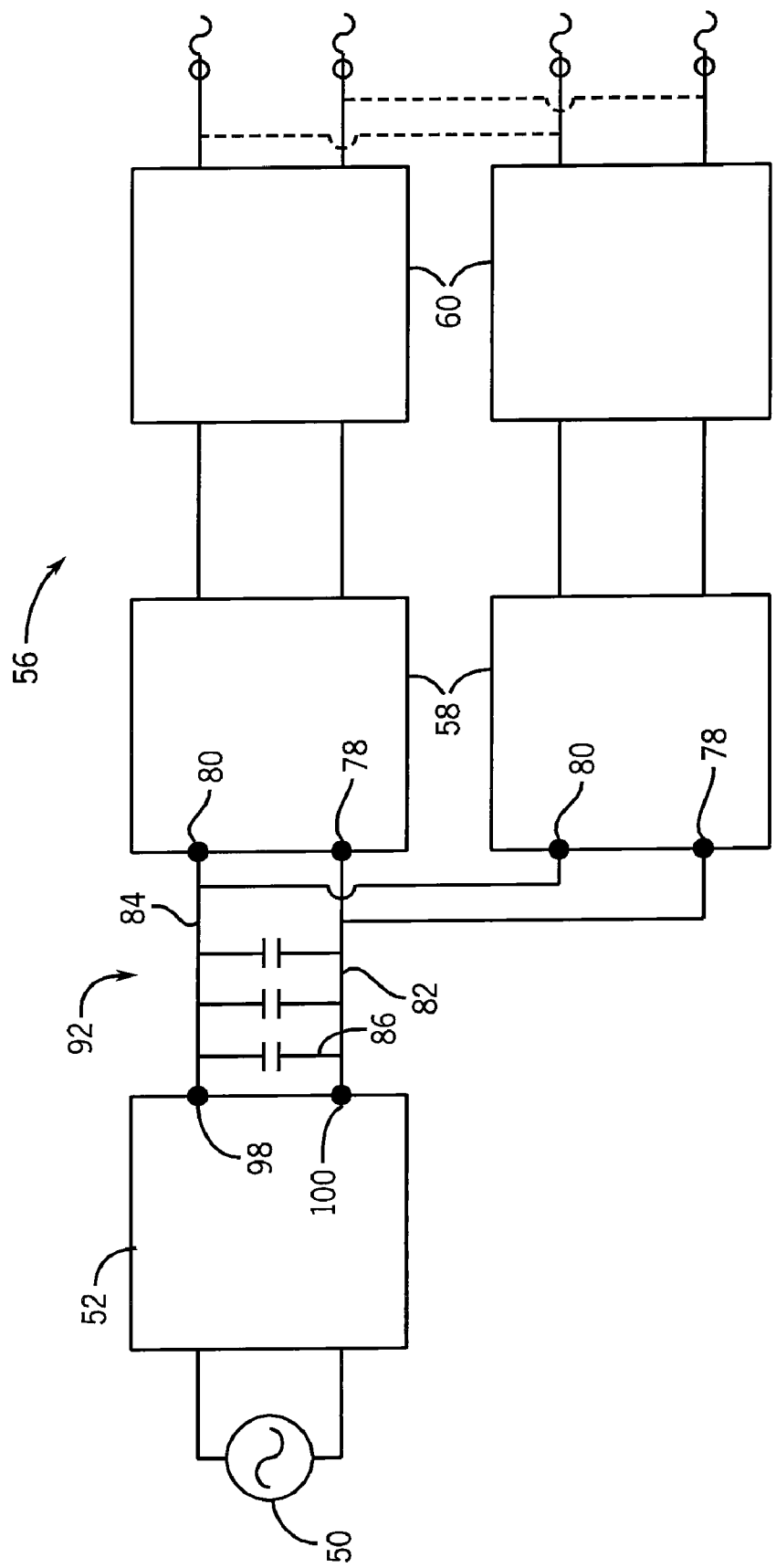
FIG. 6 is a simplified schematic view of the power supply of FIG. 2.

Referring now to FIGS. 2-3 and 6, battery charger power supply 22 can include a housing structure with a base 38, sides 40 (only one shown), top cover 42, front panel 44, rear panel 46, and A-frame assembly 48. Louvers 45 can be part of front panel 44 and/or rear panel 46, and fan 47 can be connected to rear panel 46. The overall circuit schematic is shown in FIG. 6 which illustrates a source of electrical power 50 (such as an electrical mains connection) which is connected to an input circuit 52. Electrical mains source 50 is typically a three phase source of electrical, but can also be a single phase, or two phase, circuit. Input circuit 52 is connected to bus assembly 54, which is connected to output circuits 56 having switched circuits 58 and filter circuits 60. Alternatively, filter circuit 60 can be considered an output circuit Input circuit 52 as used herein includes any circuit capable of receiving an input signal from a source of power and providing an output signal to a battery charging switched circuit, and can include a primary box 62 (which may have input fuses, terminal strips and other connectors and components) for receiving the input electrical power 50 and a three phase transformer 64 connected thereto, and which is supported by A-frame assembly 48. Input circuit 52 includes a rectifier which rectifies the output of transformer 64. Input circuit 52 can include as part of its circuitry, microprocessors, analog and digital controllers, switches, other transformers, other rectifiers, inverters, electrical chokes, converters, choppers, comparators, phased controlled devices, buses, preregulators, diodes, inductors, capacitors, resistors, fuses, etc.

Output circuit 56 as used herein includes any circuit capable of receiving an input signal from an input circuit and providing an output signal suitable for a battery charger-type output signal (e.g., suitable for battery charging). Output circuits can include microprocessors, analog and digital controllers, switches, other transformers, rectifiers, inverters, electrical chokes, converters, choppers, comparators, phased controlled devices, buses, pre-regulators, diodes, inductors, capacitors, resistors, etc. In particular, filter circuit 60 can include output filter chokes 66, output capacitors 68 and output fuse block 70. While the illustrated embodiment shows output circuit 56 as including two sets of switched circuits 58 and filter circuits 60 arranged in parallel, other configurations are contemplated. For example, only one switched circuit 58 and filter circuit 60 may be included or other combinations of switched circuits 58 and filter circuits 60.

Figure 4:
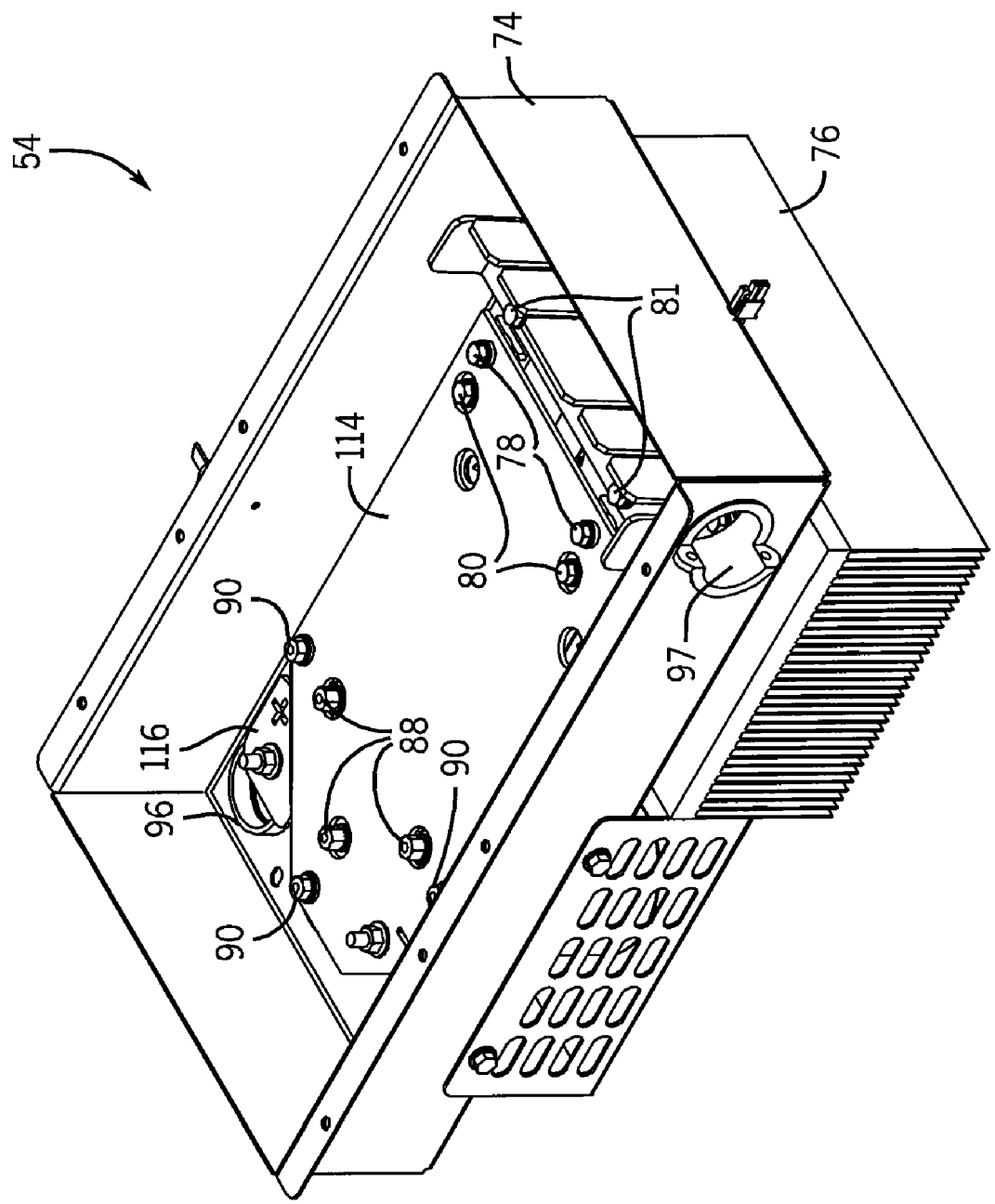
FIG. 4 is a perspective view of the bus assembly used in the power supply of FIG. 2.
Figure 5:
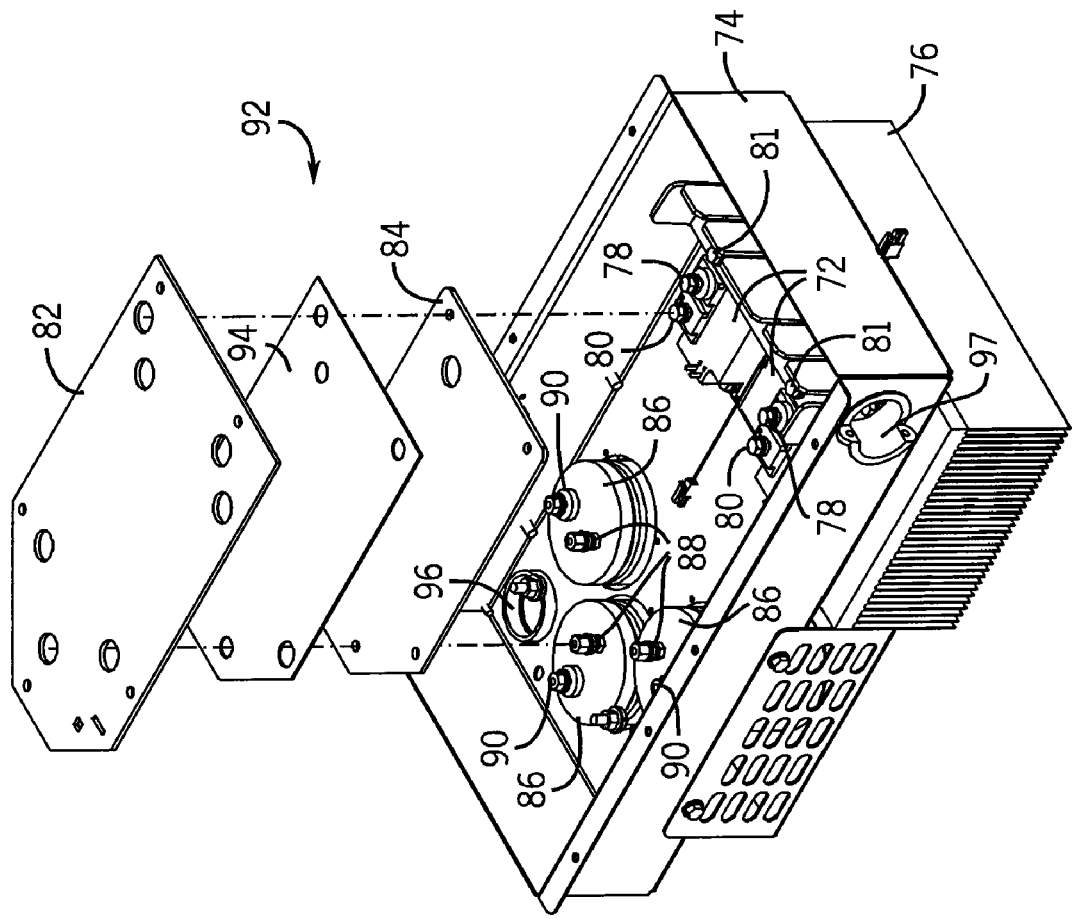
FIG. 5 is an exploded of the bus assembly of FIG. 4.

In the embodiment of FIGS. 1-6, and referring more particularly to FIGS. 4 and 5, switched circuit 58 is at least partially integrated into bus assembly 54. IGBT-diode switching-rectifying modules 72 extend within housing 74, and are also connected to heat sink 76. Each of modules 72 include a negative input terminal 78 and a positive input terminal 80 which are connected to respective negative bus plate 82 and a positive bus plate 84. Each of modules 72 also include at least one output terminal 81 to connect to a corresponding filter circuit 60. Although switching modules 72 preferably include IGBTs, they can have other switches. Capacitors 86 include positive terminal 88 and negative terminal 90 are inside housing 74; however, the bulk of the capacitors are outside housing 74. Also, switching-rectifying modules 72 are primarily inside housing 74, but are thermally connected to heat sink 76 which is outside housing 74. Housing 74 can be enclosed with a cover (not shown), and in which case, does not have forced liquid flow, and can be made of metal, plastic or other rigid material. Because heat sink 76 and capacitors 86 are primarily outside of housing 74, a fan can force air flow past these hot components, and provide the necessary cooling. The design of plates 82 and 84 allow for sufficiently reduced heating and improved heat dissipation to avoid the need for having airflow past these bus plates. Thus, housing 74 may be enclosed, protecting the components therein.

A bus 92 in accordance with an embodiment of the present invention includes a conductive negative bus plate 82, an insulator plate 94 and a conductive positive bus plate 84 abutting against one another, which are mounted in housing 74. Plate 82 is electrically connected to a negative terminal of each of capacitors 86 of the capacitor bank, and to the negative terminal of parallel switch modules 72. Plates 82, 84, 94 include holes therethrough for fasteners to attach to the positive terminals 80, 88 to a corresponding positive bus plate 84, and negative terminals 78, 90 to a corresponding negative bus plate 82, and/or to affix the plates in position. Plate 82 has a long dimension of over about 11 inches and a width of over about 7 inches. The surface area is approximately 70 square inches. The thickness or depth of plate 82 is preferably about 0.125 inches. Thus, the ratio between the surface area (sq. in.) and thickness (in.) is about 560 (the ratio is different for different measuring units). The greater cross-section (7 in.× 0.125 in.) allows for less heat because there is less impedance, and thus less heating, while the greater surface area (approximately 7 in.×11 in.) allows for more heat dissipation. The thin profile saves cost and weight. Various embodiments provide for ratios of surface area (sq. in.) to thickness (in.) of at least 200:1 or 400:1. Plates 82, 84 and 92 have similar holes therethrough, although in some instances the holes are clearance holes for the fasteners which attach to the terminals, and in other instances, the holes are clearance holes for the terminals but are smaller than the fasteners in order to attach a specific terminal to a specific plate, as is shown in FIGS. 4 and 5. Plates 82, 84 and 92 have similar dimensions and ratios although notably negative bus plate 82 is slightly larger in order to connect to the negative terminals 78, 90. (Thickness, as used herein, refers to the dimension perpendicular to the larger surfaces of the plate.)

Housing 74 can include knockout 96 which allows for electrical connection between plates 82, 84 and output terminals 98, 100 of input circuit 52; and another knockout 97 to connect switch modules 72 to a corresponding filter circuit 60. Further, each one of the switched circuits 58 in FIG. 6 includes, and is essentially, a single switching-rectifying module 72.

Power supply 22 can include other elements such as current sensor 99, which is part of the control loop for charger 22. Additionally, and as is shown by the dashed lines in FIG. 6, the outputs of filter circuits 60 can be connected in parallel to provide a faster charging rate.

Figure 7:
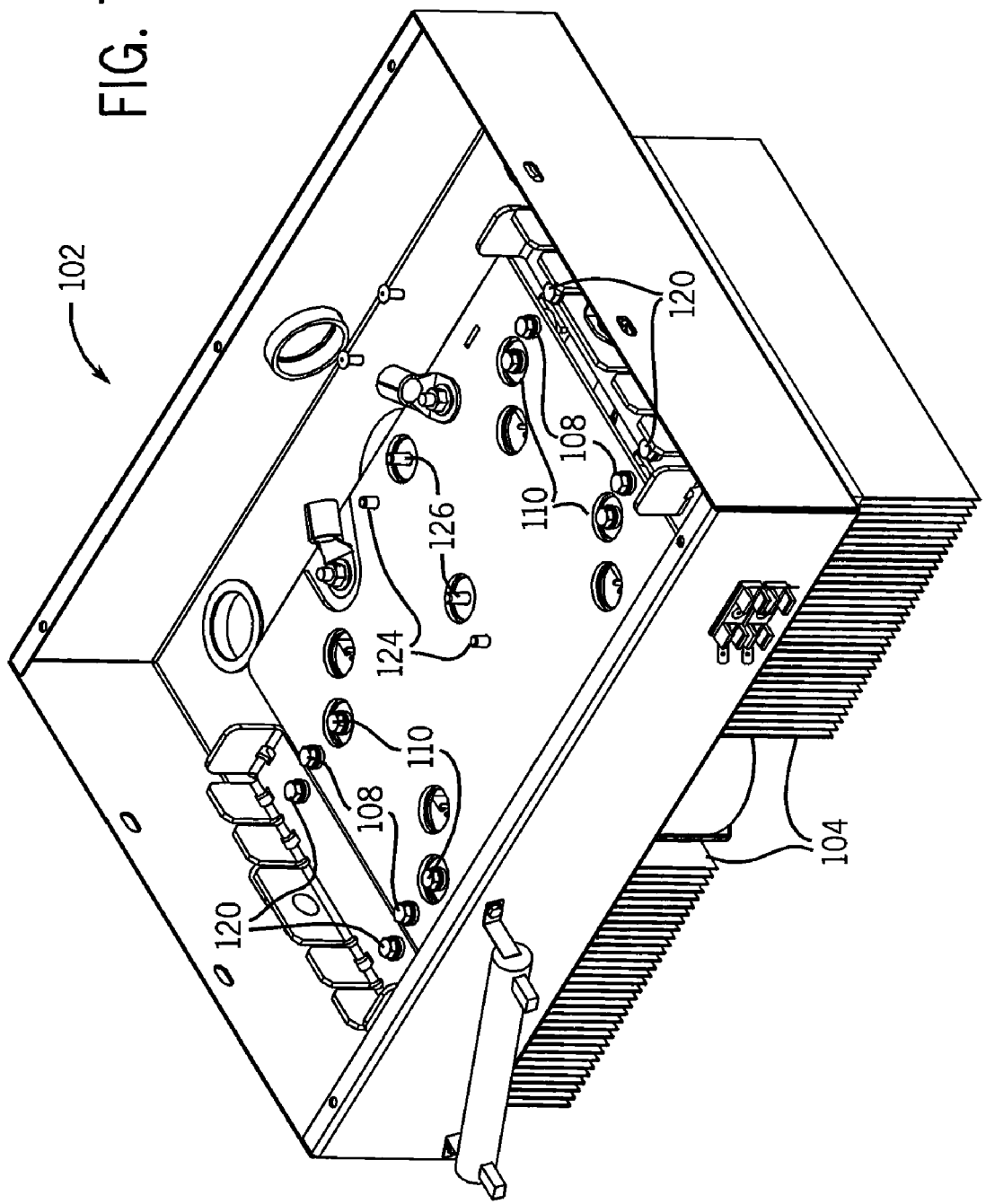
FIG. 7 is a perspective view of another embodiment of a bus assembly according to the present invention.
Figure 8:
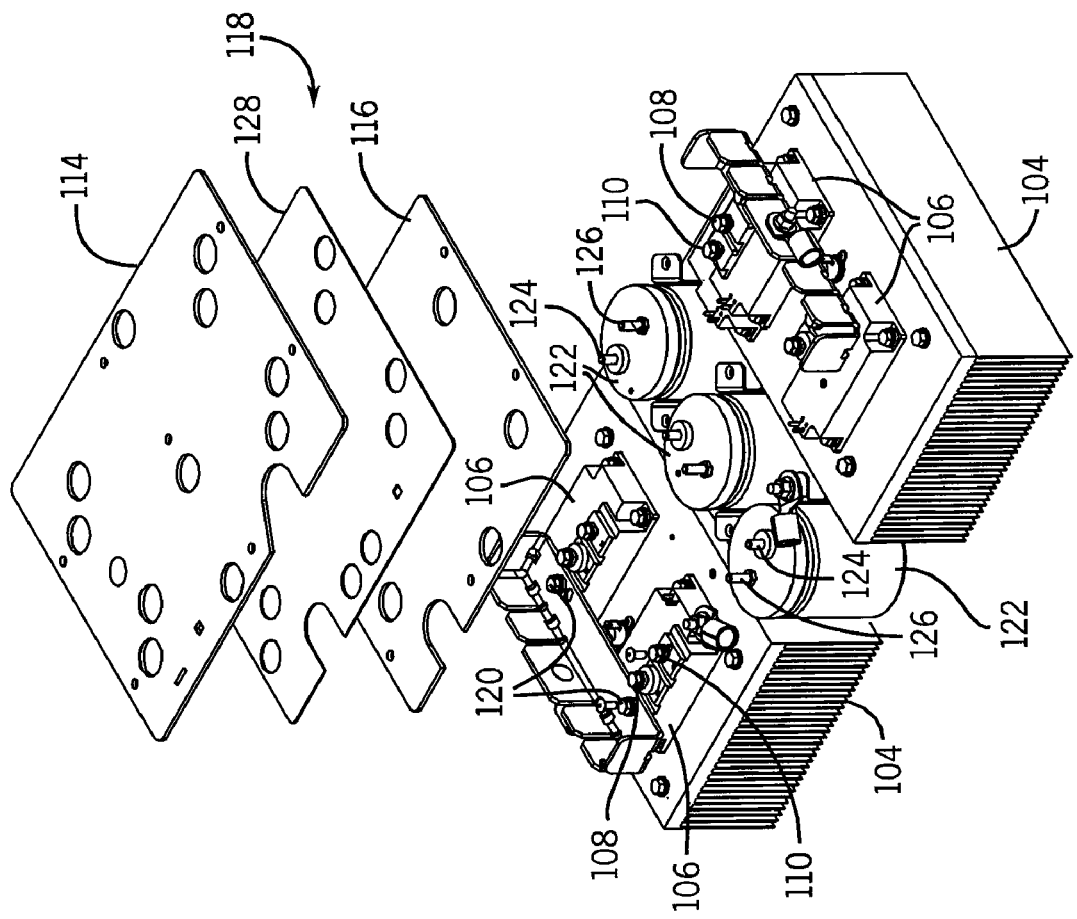
FIG. 8 is an exploded perspective view of the bus assembly of FIG. 7.

In the embodiment of FIGS. 7 and 8, bus assembly 102 includes two heat sinks 104, each of which are thermally connected to two switching-rectifying modules 106. In this embodiment, which generally has a higher battery-charging power output than the embodiment of FIGS. 4 and 5 (30 kW versus 20 kW, for example), there are two switching-rectifying modules 106 in parallel for each switched circuit 58. Each of modules 106 include a negative input terminal 108 and a positive input terminal 110 which are connected to respective negative bus plate 114 and a positive bus plate 116, of bus 118. Each of modules 106 also include at least one output terminal 120 to connect to a corresponding filter circuit 60. Capacitors 122 replace capacitors 86 and include negative terminals 124 and positive terminals 126 which are arranged to connect to respective negative bus plate 114 and a positive bus plate 116, of bus 118. As with bus assembly 54, bus assembly 102 includes conductive plates 114 and 116, in addition to insulator plate 128. Plates 114, 116 and 128 of characteristics similar to 82, 84 and 94, although they have a different hole layout to accommodate the different topology of bus assembly 102.

While example embodiments and applications of the present invention have been illustrated and described, including a preferred embodiment, the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A battery charging system comprising:
   an input circuit configured to receive an input power and provide an output power on a first output terminal and a second output terminal;
   an output circuit having a first input terminal connected to the first output terminal and a second input terminal connected to the second output terminal to receive the output power and configured to condition the output power for a battery charging process;
   a first conductive plate having a first bus surface extending between the first input terminal and the first output terminal;
   an insulator plate having a first insulator surface disposed in an abutting relationship with the first bus surface and having a second insulator surface; and
   a second conductive plate having a second bus surface extending between the second input terminal and the second output terminal and disposed in an abutting relationship with the second insulator surface.

2. The battery charging system of claim 1, further comprising a capacitor having a first terminal electrically connected to the first conductive plate and a second terminal electrically connected to the second conductive plate.

3. The battery charging system of claim 1, wherein the output circuit includes an inductor connected to receive the output power from the first output terminal and the second output terminal to condition the output power for the battery charging process.

4. The battery charging system of claim 1, wherein the input circuit includes a rectifier configured to process the input power and to deliver the input power to the first input terminal and the second input terminal.

5. The battery charging system of claim 1, wherein the insulator plate has a thickness extending between the first insulator surface and the second insulator surface, wherein the first insulator surface has a surface area, and wherein a ratio of the surface area in inches$^2$ to the thickness in inches is at least 200:1.

6. The battery charging system of claim 1, wherein the first conductive plate has a first conductive thickness extending perpendicular to the first surface, wherein the first surface has a first conductive surface area, and wherein a ratio of the first conductive surface area in inches$^2$ to the first conductive thickness in inches is at least 200:1.

7. The battery charging system of claim 1, wherein the second conductive plate has a second conductive thickness extending perpendicular to second surface, wherein the second surface has a second conductive surface area, and wherein a ratio of the second conductive surface area in inches$^2$ to the second conductive thickness in inches is at least 200:1.

8. The battery charging system of claim 1, wherein the insulator plate has a thickness extending between the first insulator surface and the second insulator surface, wherein the first insulator surface has a surface area, and wherein a ratio of the surface area in inches$^2$ to the thickness in inches is at least 400:1.

9. The battery charging system of claim 1, wherein the first conductive plate has a first conductive thickness extending perpendicular to the first surface, wherein the first surface has a first conductive surface area, and wherein a ratio of the first conductive surface area in inches$^2$ to the first conductive thickness in inches is at least 400:1.

10. The battery charring system of claim 1, wherein the second conductive plate has a second conductive thickness extending perpendicular to second surface, wherein the second surface has a second conductive surface area, and wherein a ratio of the second conductive surface area in inches$^2$ to the second conductive thickness in inches is at least 400:1.

11. The battery charging system of claim 1, further comprising a battery charger housing having no forced liquid flow therethrough.

12. A battery charging system, comprising:
an input circuit including a rectifier for receiving and rectifying an input electrical power thereby producing a rectified electrical power, the input circuit having a first output terminal and a second output terminal for outputting the rectified electrical power;
a switched circuit having a first input terminal and a second input terminal for receiving the rectified electrical power, the switched circuit including at least one switch for transforming the rectified electrical power to a switched power;
an output circuit connected to the switched circuit to receive the switched power and produce a battery charging power;
battery charging cables connected to the output circuit to receive the battery charging power; and
a bus assembly connecting the input circuit to the switched circuit, the bus assembly including a first bus plate extending along a first plane and configured to carry a positive charge and a second bus plate extending along a second plane and configured to carry a negative charge.

13. The battery charging system of claim 12 further comprising an insulator plate co-extending with at least one of the first bus plate and the second bus plate to electrically isolate the first bus plate from the second bus plate.

14. The battery charging system of claim 12, wherein the first plane is substantially parallel with the second plane.

15. The battery charging system of claim 14, further including an insulating layer between the first bus plate and the second bus plate to electrically isolate the first bus plate from the second bus plate.

16. The battery charging system of claim 15, wherein the insulating layer has an insulating thickness extending between the first bus plate and the second bus plate, and the insulating layer has a insulating planar surface area, and wherein a ratio of the insulating planar surface in inches$^2$ to the insulating thickness in inches is at least 200:1.

17. The battery charging system of claim 12, further including at least one capacitor electrically connected between the input circuit and the switched circuit, each said at least one capacitor including a positive capacitor terminal and a negative capacitor terminal, the first bus plate being connected to each positive capacitor terminal, and the second bus plate being connected to each negative capacitor terminal.

18. The battery charging system of claim 12, wherein the first bus plate has a first conductive thickness extending perpendicular to a planar surface of the first bus plate, and the planar surface has a planar surface area, wherein a ratio of the planar surface area in inches$^2$ to the first conductive thickness in inches is at least 200:1.

19. The battery charging system of claim 12, wherein the battery charging system is a fast charging system.

20. A method of manufacturing a bus assembly in a battery charger, the bus assembly connecting an input circuit having a first output terminal and a second output terminal, and a switched circuit having a first input terminal and a second input terminal, the method comprising the steps of:
providing a bus including a first conductive plane and a second conductive plane separated by an insulating layer;
connecting the first conductive plane to the first output terminal and the first input terminal;
connecting the second conductive layer to the second output terminal and the second input terminal; and
isolating the first conductive plane from the second conductive plane by arranging a substantially planar electrical isolator to abut the first conductive plane along a first side and the second conductive plane along a second side.

21. The method of claim 20, further including at least one capacitor electrically connected between the input circuit and the switched circuit, each said at least one capacitor including a positive capacitor terminal and a negative capacitor terminal, the method further including the steps of coupling each positive capacitor terminal to the first conductive plane, and conjoining each negative capacitor terminal to the second conductive plane.

* * * * *